(12) United States Patent
Agarwal et al.

(10) Patent No.: US 9,381,709 B2
(45) Date of Patent: Jul. 5, 2016

(54) OXYGEN SCAVENGING POLYESTER COMPOSITION

(71) Applicant: Reliance Industries Limited, Mumbai (IN)

(72) Inventors: Uday Shankar Agarwal, Mumbai (IN); B. V. Venkatarishnan, Chennai (IN); Rajesh Jalan, Delhi (IN); Thaliyil Veedu Sreekumar, Kerala (IN); Srinivasacharya Ramacharya Ayodhya, Navi Mumbai (IN); Ashwin Kumar Jain, Navi Mumbai (IN); Shivamurthy Padadayya Jadimath, Karnataka (IN); Pushap Sudan, Patalganga (IN); Anant Gajanan KelKar, Khopoli (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 31 days.

(21) Appl. No.: 14/193,162

(22) Filed: Feb. 28, 2014

(65) Prior Publication Data

US 2014/0193629 A1  Jul. 10, 2014

Related U.S. Application Data

(63) Continuation-in-part of application No. 13/289,687, filed on Nov. 4, 2011, now abandoned, which is a continuation of application No. PCT/IN2010/000291, filed on May 5, 2010.

(30) Foreign Application Priority Data

May 7, 2009 (IN) .......................... 1199/MUM/2009

(51) Int. Cl.
| | |
|---|---|
| *B29D 22/00* | (2006.01) |
| *A23L 3/3436* | (2006.01) |
| *C08G 63/688* | (2006.01) |
| *C08L 67/02* | (2006.01) |
| *B29D 23/00* | (2006.01) |

(52) U.S. Cl.
CPC ............. *B29D 22/003* (2013.01); *A23L 3/3436* (2013.01); *C08G 63/6886* (2013.01); *C08L 67/02* (2013.01)

(58) Field of Classification Search
CPC ............................ B65D 81/18; B29D 22/003
USPC ......... 428/34.1, 34.6, 34.7, 35.2, 35.7, 36.91, 428/36.92, 220; 252/188.2; 264/328.1, 523; 524/413, 419, 435, 538, 539; 525/389; 528/295

See application file for complete search history.

(56) References Cited

U.S. PATENT DOCUMENTS

| | | | |
|---|---|---|---|
| 5,281,360 A | 1/1994 | Hong et al. | |
| 5,300,572 A | 4/1994 | Tajima et al. | |
| 5,922,782 A * | 7/1999 | Khemani ........... | C08G 63/6886 521/182 |
| 6,083,585 A | 7/2000 | Cahill et al. | |
| 6,297,320 B1 * | 10/2001 | Tang ......................... | C08F 8/30 525/107 |
| 6,831,123 B1 * | 12/2004 | Chisholm ................ | C08K 9/04 524/442 |
| 7,049,359 B2 | 5/2006 | Cochran et al. | |
| 2002/0169273 A1 | 11/2002 | Duan | |
| 2006/0199921 A1 | 9/2006 | Hale et al. | |
| 2006/0202161 A1 | 9/2006 | Share et al. | |
| 2007/0088133 A1 | 4/2007 | Heater | |
| 2009/0170997 A1 | 7/2009 | Kannan et al. | |

FOREIGN PATENT DOCUMENTS

| | | |
|---|---|---|
| EP | 0301719 A1 | 2/1989 |
| EP | 0927218 A1 | 7/1999 |
| EP | 1663630 A1 | 6/2006 |
| EP | 1773590 A1 | 4/2007 |
| EP | 1778791 A2 | 5/2007 |
| EP | 1784300 A1 | 5/2007 |
| EP | 1838798 A2 | 10/2007 |
| WO | WO-9812244 A1 | 3/1998 |
| WO | WO-2005023530 A1 | 3/2005 |
| WO | WO-2006017597 A1 | 2/2006 |
| WO | WO-2006023583 A2 | 3/2006 |
| WO | WO-2006025827 A1 | 3/2006 |
| WO | WO-2006/052892 A1 | 5/2006 |
| WO | WO-2006062816 A2 | 6/2006 |
| WO | WO-2006063032 A2 | 6/2006 |
| WO | WO-2006132671 A1 | 12/2006 |

OTHER PUBLICATIONS

U.S. Office Action regarding U.S. Appl. No. 13/289,687, mailed Jan. 15, 2013.
U.S. Final Office Action regarding U.S. Appl. No. 13/289,687, mailed Aug. 29, 2013.

* cited by examiner

*Primary Examiner* — Terressa Boykin
(74) *Attorney, Agent, or Firm* — Harness, Dickey & Pierce, P.L.C.

(57) ABSTRACT

The present disclosure provides a polyester polymer product which contains partially or fully cobalt-neutralized organic sulphonic acid component and which is substantially free of ether and its preparation. The present disclosure also provides an oxygen scavenging composition made from a mixture of the polyester polymer product of the present disclosure, an organic oxidizable polymeric component and optionally at least one additional polyester component. The present disclosure further provides a packaging article defined by walls having an oxygen transmission rate (OTR) less than 0.2 $cc \cdot m^{-2}$ $day^{-1}$ at 0.28 mm thickness and its preparation.

22 Claims, No Drawings

OXYGEN SCAVENGING POLYESTER COMPOSITION

CROSS-REFERENCE TO RELATED APPLICATIONS

This application is a continuation-in-part of U.S. application Ser. No. 13/289,687, filed on Nov. 4, 2011, published as US 2012/0094050, now abandoned, which is a continuation of International Application No. PCT/IN2010/000291, filed May 5, 2010, and which claims priority from Indian Application No. 1199/MUM/2009, filed on May 7, 2009. The disclosures of the above applications are incorporated herein by reference.

FIELD OF INVENTION

The present disclosure relates to a polyester polymer product containing low amount of ether content and its method of preparation. The present disclosure also relates to a packaging article with improved oxygen barrier properties and its preparation.

DEFINITIONS

As used in the present specification, the following words and phrases are generally intended to have the meanings as set forth below, except to the extent that the context in which they are used indicate otherwise.
DEG means diethylene glycol.
F&B means food and beverage.
I.V. means Intrinsic Viscosity.
MXD6 means poly(m-xylene adipamide).
OTR means 'Oxygen Transmission Rate.

BACKGROUND

Packaging in whatever form—rigid or flexible—not only serves to contain substances inside, but is also required to prevent inward transmission of harmful substances, if any, from the outside environment. Atmospheric oxygen is one such relatively harmful substance that reduces shelf life of a packaged product by promoting quicker degradation or denaturation, especially as far as packaged F&B products are concerned.

Compared with glass, the traditional packaging material for food & beverage, polymeric packaging has advantages of lighter weight, less breakability, less consumption of packaging material for unit packaged substance and hence reduced cost. However, the packaging made of polymeric material generally lacks the barrier that glass could provide against inward and outward flow of gases, particularly water, carbon dioxide and oxygen. This disadvantage has greatly restricted the use of polymeric material in packaging foods and beverages.

Polyethylene terephthalate (PET) is a prolifically used packaging material, especially for substances including but not limited to carbonated beverages and beer. It provides nearly glass-like clarity and is about 10 times as impermeant to oxygen as polypropylene, another potential choice of material in this regard. PET can also serve for almost absolute oxygen barrier for practically large lengths of shelf life, given sufficient wall thickness. However, there is always a need to reduce the cost to packaging relative to the cost of the packaged substance, wherein wall thickness reduction can contribute substantially. Wall thickness reduction, on the other hand, deteriorates effective oxygen barrier of PET and reduces shelf life of a packaged product significantly, hence the need for an, added oxygen barrier substance with generic PET.

Although there are extremely impermeable polymers like ethylene-vinyl alcohol copolymers and vinylidene-vinyl chloride copolymers available, they are not the choices of the processor as single polymer solutions for making bottles or other packages because of relatively high cost. Neither are they effective as barriers when blended with PET as they are only passive, physical barriers of oxygen and can lead to leakage through barrier to oxygen through those locations in the blend morphology where the respective phases are not present. Therefore, these materials cannot be efficiently incorporated in single-layer packaging solutions. The more common solution employing these passive barrier materials is multiple layer packaging, where the layer of barrier is composed of a homogeneous phase of anyone of the above copolymers and the other layers are made of any other generic polymer like PET or polypropylene, which still remain less cost effective propositions. Packages made out of multilayered structures utilizing such barrier copolymers in the core layer also need to be hermetically sealed as any inadvertently introduced oxygen would remain inside and degrade or denature the packaged product before the expiry of the shelf life.

On the other hand, U.S. Pat. No. 5,300,572A, U.S. Pat. No. 6,083,585A, U.S. Pat. No. 7,049,359B2, US20060202161A1, US20070088133A1, WO2005023530A1, WO2006063032A2 and WO2006132671A1 teach the use of alternative barrier materials, called the "active oxygen barriers", which deplete oxygen by consuming it, i.e. by themselves getting oxidized by the atmospheric oxygen. The biggest advantage is that any inadvertently introduced oxygen inside the packaged environment is also consumed by the package itself, when made of packaging materials comprising these active oxygen barrier substances. U.S. Pat. No. 5,300,572A, U.S. Pat. No. 6,083,585A and US20060202161A1 disclose that unsaturated olefin copolymers, oligomers or such blocks in copolyester can act as active oxygen barrier in the presence of transition metal catalysts. A transition metal in its positive oxidation state catalyzes the oxidation of the unsaturated olefin oligomer or copolymer block in the presence of UV or visible light. U.S. Pat. No. 7,049,359B2, US20070088133A1, WO2005023530A1, WO2006063032A2 and WO2006132671 A1 on the other hand disclose that partially aromatic polyamides also act similarly as "active oxygen barriers" and their oxidation is similarly catalyzed by transition metals. One example of such a polyamide—as disclosed in U.S. Pat. No. 7,049,359B2—is a copolymer of m-xylenediamine and adipic acid (MXD6). Whether the active oxygen barrier material is the olefin oligomeric block in copolyester or the polyamide, such a material is blended with generic packaging polyester like polyethylene terephthalate (PET) to provide a final packaging solution. The resultant blend is a process-able resin, which is generally referred to as the "oxygen scavenging composition". The scavenging resin forms the barrier layer, which can be employed either as a single layer packaging or as one or more layers in a multi-layer packaging where the other layers are made of generic polyester or polyolefin, e.g. PET or polypropylene (PP). U.S. Pat. No. 7,049,359B2 discloses that MXD6 can be advantageously employed in 1-7 wt % of the whole formulation. Generally, the active oxygen barrier material is present in less than 10 wt % of the total scavenging resin formulation, thus providing resultant barrier polyester at a minimal cost addition to that of the generic polyester.

Whether the active oxygen barrier material inside the scavenging resin is an unsaturated olefin copolymer or an unsaturated oligomeric olefin block in a copolyester resin or a partially aromatic polyamide copolymer, a sulphonated polyester copolymer where the sulphonate pendant has an alkali metal as a counter cation has generally been employed as a compatibilizer in the prior art, for making a blend of the above with a generic polyester or copolyester, like the polyethylene terephthalate (PET).

Although WO2006132671A1 teaches that the transition metal for employing in the catalysis of the oxidation of the active oxygen barrier can be any metal from Group 3, 4, 13, or 14, the most frequently used transition metal for this purpose has been found to be cobalt (Co). Other metals like Zn have also been un-frequently employed. It has been generally found that the Co metal is employed in its positive oxidation state. US20060202161A1 discloses use of a Co salt of various long chain organic carboxylic acids (or, fatty acids) for this purpose. Other Co-salts have also been disclosed. WO2006063032A2 states that even virgin Co or Zn metal can also be employed in the scavenging resin.

Catalytic metal compounds have been described as oxidation catalyst in the prior art. Among the suggested compounds, metal salts of long chain fatty acids are preferred (WO 2005/023530). Cobalt-octoate is one such example. However, these long fatty acids and their metal salts are not soluble in ethylene glycol or water which are the common carriers employed for additives during polymerization. For example, cobalt octoate can be sourced as a solution in hydrocarbon solvents that are flammable. These solutions offer the possibility of incorporating cobalt octoate in polyester either by coating polyester chips prior to extrusion while devolatilizing the solvents which demands special equipment, or by addition during commercial polymerization where the devolatilization would contaminate the recycling monomer and condensates, thus demanding additional separation process/equipment. Even if solvent free cobalt octoate or some other Co salt or oxide can be sourced, its addition during polymerization would not lead to uniform distribution in polymer as it is known in the art of polyester polymerization that salts and catalysts are best added as solutions in the monomer ethylene glycol (e.g. US 2002/0169273) or in the polymerization product water.

EP0301719 discloses a composition comprising a polymer and having oxygen-scavenging properties, characterised in that the composition scavenges oxygen through the metal-catalysed oxidation of an oxidisable organic component which is either a polyamide or a poly olefin. The metal oxidation catalyst as taught by EP0301719 is ($C_8$-$C_{10}$) cobalt carboxylate which is introduced in the form of a solution in white spirit.

EP1838798 discloses a molten formulated polyester polymer composition that comprises zinc, cobalt, and a blend of a polyester polymer and an oxygen scavenging composition. The oxygen scavenging composition in the case of EP 1838798 comprises a polyamide polymer, and at least a portion of the cobalt present in the molten composition is virgin cobalt.

EP0927218 discloses a bilayered packaging article comprising an oxygen barrier laminar composition comprising a melt formed layer of polyester: copolymer comprising predominantly polyester segments and an oxygen scavenging amount of polyolefin oligomer segments. Another layer in the article is selected from the group consisting of polyethylenevinyl alcohol, polyolefin, and polyester lacking polyolefin oligomer segments. The polyester copolymer of EP0927218 is capable of absorbing at least 0.4 cc of oxygen per gram of copolymer at temperatures in the range of about 4° C. to about 60° C.

EP1773590 discloses a multilayer structure, wherein one of the layers is produced from a copolymer, which comprises polyester and repeat units derived from 0.001 to 7 mole % of a sulfonic acid comonomer.

EP1663630 discloses a composition for containers comprising: polyester, partially aromatic polyamide, ionic compatibilizer, and a cobalt salt. The ionic compatibilizer as taught in EP 1663630 is a copolyester containing a metal sulfonate salt. Cobalt is an essential component of the composition which acts as a metal oxidation catalyst.

EP1778791 discloses a melt blended resin for packaging articles that comprises a base polymer, oxidizable organic polymer, transition metal catalyst, and a colorant. The transition metal catalyst as used in EP 1778791 is in the form of cobalt stearate. Further, EP1778791 also teaches incorporation of an alkali metal sulfonate as an, ionic compatibilizer in the resin which is 5-sodiumsulfoisophthalic acid.

EP1784300 teaches an oriented article comprising a blend of polyester and polyamide in which the refractive index difference between said polyester and said polyamide is less than 0.01. The polyester includes an ionic compatibilizer which is a copolyester containing a metal sulfonate salt, wherein the metal ion can be Na+, Li+, K+, Zn++, Mn++, Ca++. The oriented article further comprises cobalt salt as an oxidation catalyst.

Prior art (U.S. Pat. No. 7,049,359) indicates that the oxygen scavenging capacity may appear only after ageing of the blend, as the oxidation catalyst may be embedded in the wrong phase, i.e. away from the scavenger polymer phase.

Another shortcoming of the oxygen scavenging compositions known in the art is that the metal oxidation catalyst present in such compositions, either in the form of a solid powder or in the form of a small molecule form of a fatty acid salt or any other small carboxylic acid salt, undesirably leach from the package wall into the contained F&B.

The prior art also discloses that Co compounds such as cobalt acetate loses the oxidation catalytic activity during the polymerization. E.g. WO2006063032 discloses that when cobalt is added as a catalyst under conditions effective (high temperature, longer residence time) to polymerize PET, the cobalt in the PET polymer was ineffective to impart active oxygen scavenging activity to a blend of that PET polymer and a polyamide polymer.

Furthermore, WO2006062816 illustrated that the addition of cobalt is not effective as an oxidation catalyst if added to a polyester polymer undergoing melt phase polymerization.

U.S. Pat. No. 5,922,782 discloses high molecular weight copolyester compositions having high melt viscosity and melt strength which render them foamable with a wide range of foaming agents. The copolyesters consist of (A) diacid residues comprising (i) residues of an aromatic dicarboxylic acid and (ii) residues of an aromatic dicarboxylic acid sulfonate monomer containing at least one divalent metal sulfonate group attached to an aromatic nucleus, and (B) diol residues comprising residues of at least one aliphatic or cycloaliphatic diol.

U.S. Pat. No. 5,922,782 is particularly directed to foamable co-polyesters which contains high amount of metal-ionomer i.e. greater than 0.1 mol %. However, U.S. Pat. No. 5,922,782 does not suggest that metal-ionomer's exhibit oxidation catalytic activity and thus not related to maintaining the catalytic activity during the polymerization. U.S. Pat. No. 5,922,782 though mentions Co, Zn and Mg as possible metals, but illustrates employing Mg in the preparation of foamable copolyesters. Thus, U.S. Pat. No. 5,922,782 does not address the difficulty associated with the preparation of Co-ionomer e.g. high extent of side reaction etherification resulting in excessive DEG.

US20090170997 discloses a composition comprising a) a polyester ionomer component comprising non-ionomeric polyester, and an ionomeric polyester copolymer which comprises (i) non-ionomeric ester units and (ii) sulfonated ionomeric ester units; b) an organoclay; c) an epoxy compound; and d) a catalytic metal salt. It also discloses articles such as body panels, quarter panels, rocker panels, trim, fenders and doors made from the composition.

US20090170997 focused on achieving exfoliation of clays with low ionic content ionomeric polyester copolymers and further improve the hydrostability of the corresponding nanocomposites without degrading the mechanical properties.

The ionic groups are introduced into polyester in a post-synthesis process such as electrophilic substitution on an aromatic ring, particularly sulfonation. US20090170997 suggested that nanocomposite comprising an ionomeric polyester copolymer and a nanoclay leads to the best combination of modulus, ductility and $O_2$ barrier properties without significantly increasing the specific gravity, and is further advantaged by the addition of epoxy additives that improve on the hydrostability of the nanocomposite. The oxygen transmission rate (OTR) of the composition disclosed in US20090170997 ranges between 0.56 and 1.15 cc mm/m$^2$ day.

The processes of the prior art documents results in article's having low oxygen barrier properties. Accordingly, there is felt a need to provide a simple process which not only focus on the problem associated with preparation of Co-ionomer e.g. high extent of side reaction etherification resulting in excessive ether but also provide a packaging article having enhanced oxygen barrier properties and which is capable of distributing the metal catalyst uniformly and retaining the oxygen scavenging activity of the metal in said article.

OBJECTS

It is an object of the present disclosure to provide a polyester polymer product containing low amount of ether content and its method of preparation.

It is another object of the present disclosure to provide an intermediate product made from the polymer product containing low amount of ether content.

It is still another object of the present disclosure to provide a simple and economic process for the preparation of a packaging material with improved oxygen barrier properties.

It is yet another object of the present disclosure to provide a safe and non-toxic packaging material.

It is another object of the present disclosure to provide a packaging material with improved oxygen barrier properties.

It is a further object of this disclosure to provide a cost effective oxygen barrier packaging material with appropriate oxygen impermeability.

It is still further object of the present disclosure to provide an oxygen barrier packaging material wherein the metal is uniformly distributed.

SUMMARY

In accordance with the present disclosure there is provided a process for preparing a polyester polymer product comprising at least partially cobalt-neutralized organic sulphonic acid component and having ether content less than 8 mole %, said process comprising the following steps:

subjecting at least one dicarboxylic acid or mono-esters, di-esters or anhydrides thereof and at least one diol to esterification in a vessel by heating under pressure to obtain an esterified product;

adding at least one at least partially cobalt-neutralized organic sulphonic acid to the esterified product to obtain a mixture;

removing at least partially the diol from the esterified product or said mixture; and heating the mixture under reduced pressure to obtain the polyester polymer product.

Typically, the step of removing the diol is carried out by at least one technique selected from the group consisting of depressurizing the vessel under heat and an inert gas sweep under heat.

The process further includes steps of extrusion of the polymer product, converting into chips, crystallization and solid state polymerization.

Typically, the dicarboxylic acid is selected from the group consisting of terephthalic acid, isophthalic acid, succinic acid, glutaric acid, adipic acid, sebacic acid, naphthalene dicarboxylic acid, cyclohexane dicarboxylic acid and combinations thereof.

Typically, the diol is selected from the group consisting of ethylene glycol, propylene glycol, 1,3-propanediol, 1,4-butanediol, 1,6-hexanediol, 8-octanediol, 1,10 decanediol, 2,2-dimethyl-1,3-propanediol, 1,4-cyclohexane dimethanol, 1,4-cyclohexanediol, cyclobutanediol, cyclobutane dimethanol, tetramethane cyclobutanediol and combinations thereof.

Typically, the ether is selected from the group consisting of diethylene glycol, polyethylene glycol, polypropylene glycol, dipropylene glycol, polytetramethylene glycol and combinations thereof.

Typically, the organic sulphonic acid is selected from the group consisting of sulfophthalic acid, dialkyl sulphopthalate, sulfoterephthalic acid, dialkyl sulfoterephthalate, sulfoisophthalic acid, dialkyl sulfoisophthalate, 4-sulfonaphtha-lene-2,7-dicarboxylic acid, dialkyl 4-sulfonaphthalene-2,7-dicarboxylate and organic sulfonic acids represented by the formula R—SO$_3$H, wherein R is an alkyl, substituted alkyl, aryl or substituted aryl moiety.

In one embodiment the at least partially cobalt-neutralized organic sulphonic acid is cobalt sulphonate of dimethylisophthalate (CoSIPM$_2$).

In another embodiment the at least partially cobalt-neutralized organic sulphonic acid is Co-pTSA.

In another embodiment the process includes a step of incorporation of at least one polymerization catalyst. Typically, the polymerization catalyst is selected from the group consisting of salts and oxides of antimony, tin and titanium.

Typically, the I.V. of said polyester polymer product ranges between 0.3 and 0.5.

In accordance with another aspect of the present disclosure there is provided a process for preparing an intermediate product made from the polymer product of the present disclosure; said process comprising mixing the polyester polymer product of the present disclosure, at least one organic oxidizable polymer and optionally a second polyester component to obtain a mass followed by drying and molding said mass to obtain an intermediate product.

Typically, the process further comprises a step of adding at least one at least partially cobalt-neutralized organic sulphonic acid during mixing the polymer product of the present disclosure, the at least one organic oxidizable polymer and optionally the second polyester component.

In accordance with another aspect of the present disclosure there is provided a process for preparing a packaging article defined by walls having an oxygen transmission rate (OTR) less than 0.2 cc·m$^{-2}$ day$^{-1}$ at 0.28 mm thickness, said process comprising the following steps:

mixing said polyester polymer product, at least one organic oxidizable polymer and optionally a second polyester component to obtain a mass; and drying and molding said mass to obtain an intermediate product followed by converting said intermediate product into the packaging article.

Typically, the oxygen transmission rate (OTR) ranges between 0.01 and 0.1 cc·m$^{-2}$ day$^{-1}$ at 0.28 mm thickness.

Typically, the process further comprises a step of adding at least one at least partially cobalt-neutralized organic sulphonic acid during mixing the polyester polymer product of the present disclosure, the at least one organic oxidizable polymer and optionally the second polyester component.

Typically, the organic oxidizable polymer is at least one selected from the group consisting of:
  i. a copolymer of m-xylenediamine and adipic acid (MXD6);
  ii. an aliphatic poly-amide comprising repeating units of the general formula —CO(CH$_2$)nCONH(CH$_2$)mNH— or (CH$_2$)pCONH—, wherein any of n, m or p is an integer between 3 and 7; and
  iii. a co-polyester, derived from hydroxyl- or carboxyl-terminated monomeric, oligomeric or polymeric olefin or olefin oxide segments capable of oxygen scavenging, constituted by at least one member selected from the group consisting of a dicarboxylic, hydroxy-carboxylic or dihydroxy compound comprising at least one olefinic unsaturation.

Typically, the organic oxidizable polymer is poly (m-xylene adipamide).

Typically, the second polyester component comprises:
  at least one member selected from the group of dicarboxylic acids comprising terephthalic acid, isophthalic acid, succinic acid, glutaric acid, adipic acid, sebacic acid, naphthalene dicarboxylic acid and cyclohexane dicarboxylic acid or anhydrides or diesters or monoesters thereof with a lower alcohol; and
  at least one member selected from the group of diols comprising ethylene glycol, propylene glycol, 1,3-propanediol, 1,4-butanediol, 1,6-hexane diol, 8-octanediol, 1,10 decanediol, 2,2-dimethyl-1,3-propanediol, 1,4-cyclohexane dimethanol, 1,4-cyclohexanediol, cyclobutanediol, cyclobutane dimethanol, tetramethane cyclobutanediol and their ester forming derivatives.

In one embodiment the second polyester component comprises a copolymeric condensate of ethylene terephthalate and ethylene isophthalate, the amount of ethylene isophthalate being <2.5 mole %. Typically, the I.V. of said second polyester ranges between 0.6 and 1.0.

Typically, the molding is carried out by using an injection molding technique in a molding machine operated at 270 to 310° C.

Typically, the step of converting said intermediate product into the oxygen barrier packaging article includes blowing of said intermediate product, said oxygen barrier packaging article is a bottle.

Typically, the mixing is carried out in a tumble mixer.

Typically, the drying is carried out at a temperature of 120 to 150° C. for a time period ranging between 4 and 8 hours.

In accordance with still another aspect of the present disclosure there is provided a polyester polymer product comprising at least partially cobalt-neutralized organic sulphonic acid component and having ether content less than 8 mole %.

In accordance with yet another aspect of the present disclosure there is provided an oxygen scavenging composition comprising:

a polyester polymer product comprising at least partially cobalt-neutralized organic sulphonic acid component and having ether content less than 8 mole %;

optionally, a polyester component comprising (i) at least one member selected from the group of dicarboxylic acids comprising terephthalic acid, isophthalic acid, succinic acid, glutaric acid, adipic acid, sebacic acid, naphthalene dicarboxylic acid and cyclohexane dicarboxylic acid or anhydrides or diesters or monoesters thereof with a lower alcohol; and (ii) at least one member selected from the group of diols comprising ethylene glycol, propylene glycol, 1,3-propanediol, 1,4-butanediol, 1,6-hexane diol, 8-octanediol, 1,10 decanediol, 2,2-dimethyl-1,3-propanediol, 1,4-cyclohexane dimethanol, 1,4-cyclohexanediol, cyclobutanediol, cyclobutane dimethanol, tetramethane cyclobutanediol and their ester forming derivatives; and an organic oxidizable polymeric component selected from the group consisting of:
  a copolymer of m-xylenediamine and adipic acid (MXD6);
  an aliphatic poly-amide comprising repeating units of the general formula CO(CH$_2$)nCONH(CH$_2$)mNH— or (CH$_2$)pCONH—, wherein any of n, m or p is an integer between 3 and 7; and
  a co-polyester, derived from hydroxyl- or carboxyl-terminated monomeric, oligomeric or polymeric olefin or olefin oxide segments capable of oxygen scavenging, constituted by at least one member selected from the group consisting of a dicarboxylic, hydroxy-carboxylic or dihydroxy compound comprising at least one olefinic unsaturation.

In accordance with still another aspect of the present disclosure there is provided a packaging article defined by walls having an oxygen transmission rate (OTR) less than 0.2 cc·m$^{-2}$ day-1 at 0.28 mm thickness made from the oxygen scavenging composition of the present disclosure.

DETAILED DESCRIPTION

The present disclosure is directed towards a polyester polymer product containing partially or fully cobalt-neutralized organic sulphonic acid component. Particularly, the present disclosure provides a polyester polymer product which contains partially or fully cobalt-neutralized organic sulphonic acid component and which is substantially free of ether. Further, the present disclosure focused on providing intermediate products such as preforms made from the polyester polymer product of the present disclosure; and an oxygen scavenging composition made from a mixture of the polyester polymer product of the present disclosure, an organic oxidizable polymeric component and optionally at least one additional polyester component.

The present disclosure furthermore provides a packaging article defined by walls with improved oxygen barrier properties made from the mixture of the polyester polymer product of the present disclosure, an organic oxidizable polymeric component and optionally at least one additional polyester component. The packaging article of the present disclosure defined by walls have an oxygen transmission rate (OTR) less than 0.2 cc·m$^{-2}$ day$^{-1}$ at 0.28 mm thickness.

The present disclosure also provides a simple and economic process for preparing a packaging article which is able to attain uniform distribution of the metal catalyst in the resulting article as well as retain the oxygen scavenging activity of the metal in said article.

Accordingly, the present disclosure provides a process for preparing a polyester polymer product comprising at least partially cobalt-neutralized organic sulphonic acid component and having ether content less than 8 mole %.

The process involves the following steps:

In the first step, at least one dicarboxylic acid or monoesters, di-esters or anhydrides thereof and at least one diol are subjected to esterification in a vessel by heating under pressure to obtain an esterified product.

In accordance with the present disclosure the dicarboxylic acid is selected from the group consisting of terephthalic acid, isophthalic acid, succinic acid, glutaric acid, adipic acid, sebacic acid, naphthalene dicarboxylic acid, cyclohexane dicarboxylic acid and combinations thereof, whereas the diol includes but is not limited to ethylene glycol, propylene glycol, 1,3-propanediol, 1,4-butanediol, 1,6-hexanediol, 8-octanediol, 1,10 decanediol, 2,2-dimethyl-1,3-propanediol, 1,4-cyclohexane dimethanol, 1,4-cyclohexanediol, cyclobutanediol, cyclobutane dimethanol, tetramethane cyclobutanediol and combinations thereof. The ether includes but is not limited to diethylene glycol, polyethylene glycol, polypropylene glycol, dipropylene glycol, polytetramethylene glycol and combinations thereof.

To the obtained esterified product at least one at least partially cobalt-neutralized organic sulphonic acid is added to obtain a mixture. The mixture is heated the under reduced pressure to obtain the polyester polymer product. The I.V. of the obtained polyester polymer product ranges between 0.3 and 0.5.

In accordance with the present disclosure the excess of diol is removed at least partially from the esterified product before the addition of cobalt-neutralized organic sulphonic acid. Alternatively, the excess of diol is removed from the mixture formed after the addition of cobalt-neutralized organic sulphonic acid to the esterified product.

The step of removing the excess diol is carried out by depressurizing the vessel to atmospheric pressure under heat. Alternatively, an inert gas sweep under heat technique is employed to remove the diol.

The process of the present disclosure also includes a step of incorporation of at least one polymerization catalyst. In accordance with the present disclosure the polymerization catalyst is selected from the group consisting of salts and oxides of antimony, tin and titanium. In one embodiment the polymerization catalyst is antimony trioxide.

The process further includes steps of extrusion of the polymer product, converting into chips, crystallization and solid state polymerization.

In accordance with the present disclosure the organic sulphonic acid is selected from the group consisting of sulfophthalic acid, dialkyl sulphopthalate, sulfoterephthalic acid, dialkyl sulfoterephthalate, sulfoisophthalic acid, dialkyl sulfoisophthalate, 4-sulfonaphthalene-2,7-dicarboxylic acid, dialkyl 4-sulfonaphthalene-2,7-dicarboxylate and organic sulfonic acids represented by the formula R—SO$_3$H, wherein R is an alkyl, substituted alkyl, aryl or substituted aryl moiety.

The cobalt neutralized organic sulphonic acid is prepared from the organic sulphonic acid and a diol which includes but is not limited to ethylene glycol, propylene glycol, 1,3 propane diol, 1,4 butanediol, 1,6 hexanediol and 8-octanediol. In accordance with the present disclosure 0.01 to 1 mole fraction of the total organic sulphonic acid is neutralized by Co metal in its oxidation state (Co$^{2+}$). In accordance with one of the preferred embodiments of the present disclosure the cobalt neutralized organic sulphonic acid is prepared from 5, sulfo dimethylisophthalate (H$^+$SO$_3^-$—C$_6$H$_3$ (CO$_2$CH$_3$)$_2$) and ethylene glycol.

In one embodiment the at least partially cobalt-neutralized organic sulphonic acid is cobalt sulphonate of dimethylisophthalate (CoSIPM$_2$).

In another embodiment the at least partially cobalt-neutralized organic sulphonic acid is Co-pTSA (p-toulene sulphonic acid).

The polymerization reaction is carried out either as a batch process or as a continuous process. A post polymerization step, such as solid state polymerization (SSP), may be required to increase the polymer molecular weight and viscosity suitable for the application such as injection molding and stretch blow molding. The co-monomer can also be blended in an additional step following the polymerization. If the addition of co-monomer leads to decrease in the polymer molecular weight, the molecular weight is increased by further polymerization, for example by addition of chain extenders or by polymerization in the solid state. Concentrated master batches of the compositions may be prepared and subsequently blended (e.g. during injection molding), as portions, to additional quantities of base polymer to achieve the final desired composition. Alternatively, the blended melt of the copolymer with other polymers is extruded to obtain polymer strands or fast quenched and then converted to chips.

In accordance with still another aspect of the present disclosure there is provided a polyester polymer product comprising at least partially cobalt-neutralized organic sulphonic acid component and having ether content less than 8 mole %.

In accordance with another aspect of the present disclosure there is provided a process for preparing an intermediate product made from the polyester polymer product of the present disclosure. The process involves mixing the polymer product of the present disclosure, at least one organic oxidizable polymer and optionally a second polyester component to obtain a mass followed by drying and molding the obtained mass to obtain the intermediate product.

In accordance with the present disclosure the organic oxidizable polymer is at least one selected from the group consisting of:

a copolymer of m-xylenediamine and adipic acid (MXD6);
  an aliphatic poly-amide comprising repeating units of the general formula CO(CH$_2$)nCONH(CH$_2$)mNH— or (CH$_2$)pCONH—, wherein any of n, m or p is an integer between 3 and 7; and
  a co-polyester, derived from hydroxyl- or carboxyl-terminated monomeric, oligomeric or polymeric olefin or olefin oxide segments capable of oxygen scavenging, constituted by at least one member selected from the group consisting of a dicarboxylic, hydroxy-carboxylic or dihydroxy compound comprising at least one olefinic unsaturation.

In one of the preferred embodiments the organic oxidizable polymer is poly (m-xylene adipamide.

The second polyester component in accordance with the present disclosure comprises:

at least one member selected from the group of dicarboxylic acids comprising terephthalic acid, isophthalic acid, succinic acid, glutaric acid, adipic acid, sebacic acid, naphthalene dicarboxylic acid and cyclohexane dicarboxylic acid or anhydrides or diesters or monoesters thereof with a lower alcohol; and
  at least one member selected from the group of diols comprising ethylene glycol, propylene glycol, 1,3-propanediol, 1,4-butanediol, 1,6-hexane diol, 8-octanediol, 1,10 decanediol, 2,2-dimethyl-1,3-propanediol, 1,4-cyclohexane dimethanol, 1,4-cyclohexanediol, cyclobutanediol, cyclobutane dimethanol, tetramethane cyclobutanediol and their ester forming derivatives.

In one embodiment the second polyester component comprises a copolymeric condensate of ethylene terephthalate and ethylene isophthalate, the amount of ethylene isophthalate being <2.5 mole %.

In accordance with the present disclosure the I.V. of said second polyester ranges between 0.6 and 1.0.

The process further includes a step of adding at least one at least partially cobalt-neutralized organic sulphonic acid during mixing the polymer product of the present disclosure, the at least one organic oxidizable polymer and optionally the second polyester component.

In accordance with another aspect of the present disclosure there is provided an oxygen scavenging composition comprising:

a polyester polymer product comprising at least partially cobalt-neutralized organic sulphonic acid component;
  optionally, a polyester component comprising (i) at least one member selected from the group of dicarboxylic acids comprising terephthalic acid, isophthalic acid, succinic acid, glutaric acid, adipic acid, sebacic acid, naphthalene dicarboxylic acid and cyclohexane dicarboxylic acid or anhydrides or diesters or monoesters thereof with a lower alcohol; and (ii) at least one member selected from the group of diols comprising ethylene glycol, propylene glycol, 1,3-propanediol, 1,4-butanediol, 1,6-hexane diol, 8-octanediol, 1,10 decanediol, 2,2-dimethyl-1,3-propanediol, 1,4-cyclohexane dimethanol, 1,4-cyclohexanediol, cyclobutanediol, cyclobutane dimethanol, tetramethane cyclobutanediol and their ester forming derivatives; and
  an organic oxidizable polymeric component selected from the group consisting of:
    a copolymer of m-xylenediamine and adipic acid (MXD6);
    an aliphatic poly-amide comprising repeating units of the general formula $CO(CH_2)nCONH(CH_2)mNH$— or $(CH_2)pCONH$—, wherein any of n, m or p is an integer between 3 and 7; and
    a co-polyester, derived from hydroxyl- or carboxyl-terminated monomeric, oligomeric or polymeric olefin or olefin oxide segments capable of oxygen scavenging, constituted by at least one member selected from the group consisting of a dicarboxylic, hydroxy-carboxylic or dihydroxy compound comprising at least one olefinic unsaturation.

In accordance with still another aspect of the present disclosure there is provided a process for preparing a packaging article defined by walls having an oxygen transmission rate (OTR) less than 0.2 cc·m$^{-2}$ day$^{-1}$ at 0.28 mm thickness.

The process involves the following steps:

In the first step the polymer product of the present disclosure (as described herein above), at least one organic oxidizable polymer and optionally a second polyester component are mixed to obtain a mass. In one embodiment the mixing is carried out in a tumble mixer.

The obtained mass is then dried and molded to obtain an intermediate product. In one embodiment the drying is carried out at a temperature of 120 to 150° C. for a time period ranging between 4 and 8 hours.

The intermediate products include but are not limited to preforms and the like. The obtained intermediate products are finally converted into the packaging article.

In one of the preferred embodiments the oxygen transmission rate (OTR) of the packaging articles made in accordance with the present disclosure ranges between 0.01 and 0.1 cc·m$^{-2}$ day$^{-1}$ at 0.28 mm thickness.

The process further involves a step of adding at least one at least partially cobalt-neutralized organic sulphonic acid during mixing the polymer product of the present disclosure, the at least one organic oxidizable polymer and optionally the second polyester component.

In one embodiment the molding is carried out by using an injection molding technique in a molding machine operated at 270 to 310° C.

In one embodiment the step of converting the intermediate product into the oxygen barrier packaging article includes blowing of the intermediate such as preform to obtain an oxygen barrier packaging article such as a bottle.

The disclosure is further illustrated by way of the following non limiting examples.

EXAMPLES

In the examples and the results that follow, the metal content of the samples was calculated from the amount added during polymerization and from the loading of the copolymerization product during injection molding. Similarly, MXD6 content of the samples was calculated from the loading of the MXD6 chips during injection molding. Intrinsic viscosity (IV) was obtained according to ASTM D4603-03 using 0.5 g/cc solution of the polymer in phenol-tetrachloroethane solvent (60:40 wt ratio, 30° C.).

Oxygen transmission rate (OTR) was determined for the 0.28 mm thick film cut out from the bottle using Mocon Ox-Tran 2/21 modular system at 23° C. and at 752 mmHg pressure. A mixture of 98% nitrogen and 2% hydrogen was used as carrier gas and 100% oxygen was used as the test gas.

Comparative Examples: 1-5 and 9-10

Present Disclosure Examples: 6-8 and 11-12

Example 1

Incorporation of 'Cobalt Acetate (CoAc)' Before the Melt Polymerization and its Effect on Barrier Properties of the Resultant Product A: Preparation of Polymer with CoAc Added after Esterification (50 Ppm Co)

Slurry of purified terephthalic acid (6 kg) in ethylene glycol (4.5 kg) was esterified at 2 bar nitrogen pressure by gradual heating in a 10 L electrically heated stainless steel autoclave equipped with a reflux column and condenser to remove the condensate, primarily water and excess EG. When the temperature reached 260° C. in about 3.5 hr, the cobalt acetate (containing 0.35 g Co) was added to the molten esterification product under stirring under the existing pressure. After an interval of 20 minutes, antimony trioxide catalyst (300 ppm Sb in PET) dissolved in ethylene glycol 250 ml was added. After Co and Sb addition, the molten product was transferred to autoclave reactor where polymerization was carried out. The mixture temperature was increased to ~285° C., while gradually reducing the pressure over 45 minutes to 1 mm of Hg to obtain the polymeric product. The copolymer product was extruded out of the reactor in the form of a strand, quenched in a water bath and sliced into chips containing 50 ppm of cobalt. The IV and DEG of the copolymer were 0.623 and 2.55% respectively.

B: SSP of PET Polymer

The copolymer chips of example 1A was further crystallized at 140° C. in air oven, and then subjected to SSP at 205° C. for 11 hrs to raise the intrinsic viscosity to 0.845 dl/g

C: Manufacture of Polyester Bottles with 50 Ppm Co 0.4 kg of MXD6 chips and 7.6 kg from example 1B were tumble mixed, dried at 150° C. for 6 hr, and injection molded using 2 cavity Arburg injection molding machine (Model Allrounder 420C) operated at cylinder temperature of 275-280° C. and runner temperature of 290-287° C., into 48 g perform. These performs were blown into bottles of 1.5 L volume using SIDEL SB0I single cavity blow molding machine. The OTR value was found to be 2.15 $cm^3 \cdot m^{-2}\, day^{-1}$ measured for film thickness of 0.28 mm.

Example 2

Incorporation of 'Cobalt Acetate' During the Melt Polymerization and its Effect on Barrier Properties of the Resultant Product

A: Preparation of Polymer with CoAc Added Before Polymerization (50 ppm Co)

Slurry of purified terephthalic acid (6 kg) in ethylene glycol (4.5 kg) was esterified at 2 bar nitrogen pressure by gradual heating in a 10 L electrically heated stainless steel autoclave equipped with a reflux column and condenser to remove the condensate, primarily water and excess EG. When the temperature reached 260° C. in about 3.5 hr, the molten product was transferred to autoclave reactor. Cobalt acetate (containing 0.35 g Co) was added to the molten product under stirring under the existing pressure. After an interval of 20 minutes, antimony trioxide catalyst (300 ppm Sb in PET) dissolved in ethylene glycol 250 ml was added. The mixture temperature was increased to ~285° C., while gradually reducing the pressure over 45 minutes to 1 mm of Hg to obtain the polymeric product. The copolymer product was extruded out of the reactor in the form of a strand, quenched in a water bath and sliced into chips containing 50 ppm of cobalt. The IV and DEG of the copolymer were 0.613 and 3.10% respectively.

B: SSP of PET Polymer

The copolymer chips of example 2A was further crystallized at 140° C. in air oven, and then subjected to SSP at 205° C. for 11 hrs to raise the intrinsic viscosity to 0.863 dl/g.

C: Manufacture of Polyester Bottles with 50 ppm Co 0.4 kg of MXD6 chips and 7.6 kg from example 2B were tumble mixed, dried at 150° C. for 6 hr, and injection molded using 2 cavity Arburg injection molding machine (Model Allrounder 420C) operated at cylinder temperature of 275-280° C. and runner temperature of 290-287° C., into 48 g perform. These performs were blown into bottles of 1.5 L volume using SIDEL SB0I single cavity blow molding machine. The OTR value was found to be 2.27 $cm^3 \cdot m^{-2}\, day^{-1}$ measured for film thickness of 0.28 mm.

Example 3

Incorporation of 'Cobalt Acetate' after the Melt Polymerization and its Effect on Barrier Properties of the Resultant Product It is found that when cobalt acetate solution in monoethylene glycol was added after the melt polymerization the resultant polymer exhibited low molecular weight. Further, the time required for polymerization was high.

Example 4

Use of 'Cobalt Acetate Concentrate' Obtained by a Process Involving Venting Technique

A: Preparation of Cobalt Acetate Dispersion 59 g of Cobalt acetate ($CoAc_2.4H_2O$) was dissolved in 600 ml of ethylene glycol

B: Preparation of Cobalt Concentrate

Slurry of purified terephthalic acid (6 kg) in ethylene glycol (4.5 kg) was esterified at 2 bar nitrogen pressure by gradual heating in a 10 L electrically heated stainless steel autoclave equipped with a reflux column and condenser to remove the condensate, primarily water and excess EG. When the temperature reached 260° C. in about 3.5 hr, the vessel was vented to depressurize to atmospheric pressure, and the cobalt acetate dispersion of Example 4A (containing 14 g Co) was added to the molten esterification product under stirring, when quick devolatilization of the added EG was reflected in rise of the reflux column temperature to about 180° C. After an interval of 20 minutes, antimony trioxide catalyst (300 ppm Sb in PET) dissolved in ethylene glycol 250 ml was added. The mixture temperature was increased to ~285° C., while gradually reducing the pressure over 45 minutes to 1 mm of Hg to obtain the polymeric product. The product was extruded out of the reactor in the form of a strand, quenched in a water bath and sliced into chips containing 2000 ppm of cobalt. The I.V. and DEG of the copolymer were 0.496 dl/g and 3.2%.

C: SSP of Copolymer

The copolymer chips of example 4B were crystallized at 140° C. in air oven, and then subjected to SSP at 205° C. for 20 hrs to raise the intrinsic viscosity to 0.573 dl/g

D: Manufacture of Barrier Polyester Bottles with 200 ppm Co 0.8 kg chips of example 4C, and 0.4 kg of MXD6 chips and 6.8 kg of base polyester (poly(ethylene terephthalate-co-ethylene isophthalate), IV=0.80 dl/g, containing 35 ppm Cobalt due addition of cobalt acetate during polymerization as color toner) were tumble mixed, dried at 150° C. for 6 hr, and injection molded using 2 cavity Arburg injection molding machine (Model Allrounder 420C) operated at cylinder temperature of 275-280° C. and runner temperature of 290-287° C., into 48 g perform. These performs were blown into bottles of 1.5 L volume using SIDEL SB0I single cavity blow molding machine. The OTR value was found to be 2.23 $cm^3 \cdot m^{-2}\, day^{-1}$ measured for film thickness of 0.28 mm.

E: Manufacture of Barrier Polyester Bottles with 50 ppm Co 0.2 kg chips of example 4C, and 0.4 kg of MXD6 chips and 7.4 kg of base polyester (poly(ethylene terephthalate-co-ethylene isophthalate), IV=0.80 dL/g, containing 35 ppm Cobalt due addition of cobalt acetate during polymerization as color toner) were tumble mixed, dried at 150° C. for 6 hr, and injection molded using 2 cavity Arburg injection molding machine (Model Allrounder 420C) operated at cylinder temperature of 275-280° C. and runner temperature of 290-287° C., into 48 g perform. These performs were blown into bottles of 1.5 L volume using SIDEL SB0I single cavity blow molding machine. The OTR value was found to be 2.34 $cm^3 \cdot m^{-2}$ $day^{-1}$ measured for film thickness of 0.28 mm.

Example 5

Use of 'Cobalt Acetate Concentrate' Obtained by a Process Devoid Venting Technique A: Preparation of Concentrate Slurry of purified terephthalic acid (6 kg) in ethylene glycol (4.5 kg) was esterified at 2 bar nitrogen pressure by gradual heating in a 10 L electrically heated stainless steel autoclave equipped with a reflux column and condenser to remove the condensate, primarily water and excess EG. When the temperature reached 260° C. in about 3.5 hr, the cobalt acetate dispersion of Example 4A (containing 14 g Co) was added to the molten esterification product under stirring under the existing pressure by employing an intermediate pressurized vessel. After an interval of 20 minutes, antimony trioxide catalyst (300 ppm Sb in PET) dissolved in ethylene glycol 250 ml was added. The mixture temperature was increased to ~285° C., while gradually reducing the pressure over 45 minutes to 1 mm of Hg to obtain the polymeric product. The copolymer product was extruded out of the reactor in the form of a strand, quenched in a water bath and sliced into chips containing 2000 ppm of cobalt. The IV and DEG of the concentrate were 0.473 and 2.7% respectively.

B: SSP of Copolymer

The chips of example 5A were crystallized at 140° C. in air oven, and then subjected to SSP at 205° C. for 20 hrs to raise the intrinsic viscosity to 0.587 dl/g C: Manufacture of Barrier Polyester Bottles with 200 ppm Co 0.8 kg of the chips of example 5B, and 0.4 kg of MXD6 chips and 6.8 kg of base polyester (poly(ethylene terephthalate-co-ethylene isophthalate), IV=0.80 dig, containing 35 ppm Cobalt due addition of cobalt acetate during polymerization as color toner) were tumble mixed, dried at 150° C. for 6 hr, and injection molded using 2 cavity Arburg injection molding machine (Model Allrounder 420C) operated at cylinder temperature of 275-280° C. and runner temperature of 290-287° C., into 48 g perform. These performs were blown into bottles of 1.5 L volume using SIDEL SB0I single cavity blow molding machine. The OTR value was found to be 2.43 $cm^3 \cdot m^{-2}$ $day^{-1}$ measured for film thickness of 0.28 mm.

Example 6(I)

Use of Co-SIPM Obtained by Process Involving Venting Technique (Depressurizing)

A: Synthesis of Cobalt Containing Comonomer 128.9 g of 5, sulfo dimethylisophthalate was dissolved in 2222.7 g ethylene glycol (EG). 58.58 g of Cobalt acetate ($CoAc_2 \cdot 4H_2O$) was added and heated for 1 hr from 20 to 140° C. while employing a condenser to collect acetic acid as a byproduct, leaving cobalt sulphonate of dimethylisophthalate ($CoSIPM_2$) solution in EG. The completion of the reaction was indicated from an increase in pH to about 4.

B: Preparation of Copolymer (Co-SIPM)

Slurry of purified terephthalic acid (6 kg) in ethylene glycol (4.5 kg) was esterified at 2 bar nitrogen pressure by gradual heating in a 10 L electrically heated stainless steel autoclave equipped with a reflux column and condenser to remove the condensate, primarily water and excess EG. When the temperature reached 260° C. in about 3.5 hr, the vessel was vented to depressurize to atmospheric pressure, and the 2352 g of Co-$SIPM_2$ solution of Example 6A (containing 13.88 g Co) was added to the molten esterification product under stirring, when quick devolatilization of the added EG was reflected in rise of the reflux column temperature to about 180° C. After an interval of 20 minutes, antimony trioxide catalyst (300 ppm Sb in PET) dissolved in ethylene glycol 250 ml was added. The mixture temperature was increased to ~285° C., while gradually reducing the pressure over 45 minutes to 1 mm of Hg to obtain the polymeric product. The copolymer product was extruded out of the reactor in the form of a strand, quenched in a water bath and sliced into chips containing 2000 ppm of cobalt. The I.V. and DEG of the copolymer were 0.43 and 5.5%.

C: SSP of Copolymer

The copolymer chips of example 6B were crystallized at 140° C. in air oven, and then subjected to SSP at 200° C. for 32 hrs to raise the intrinsic viscosity to 0.70.

D: Manufacture of Barrier Polyester Bottles with 200 ppm Co 0.8 kg of the copolymer chips of example 6C (containing 2000 ppm Co from Co-$SIPM_2$), and 0.4 kg of MXD6 chips and 6.8 kg of base polyester (poly(ethylene terephthalate-co-ethylene isophthalate), IV=0.80 dig) were tumble mixed, dried at 150° C. for 6 hr, and injection molded using 2 cavity Arburg injection molding machine (Model Allrounder 420C) operated at cylinder temperature of 275-280° C. and runner temperature of 290-287° C., into 48 g perform. These performs were blown into bottles of 1.5 L volume using SIDEL SB0I single cavity blow molding machine. The OTR value was found to be 0.03 $cm^3 \cdot m^{-2}$ $day^{-1}$ measured for film thickness of 0.28 mm.

Example 6(II)

Use of Co-SIPM Obtained by Process Involving Venting Technique (Inert Gas Sweep)

A: Synthesis of Cobalt Containing Comonomer 128.9 g of 5, sulfo dimethylisophthalate was dissolved in 2222.7 g ethylene glycol (EG). 58.58 g of Cobalt acetate (CoAc$_2$.4H$_2$O) was added and heated for 1 hr from 20 to 140° C. while employing a condenser to collect acetic acid as a byproduct, leaving cobalt sulphonate of dimethylisophthalate (CoSIPM$_2$) solution in EG. The completion of the reaction was indicated from an increase in pH to about 4.

B: Preparation of Copolymer (Co-SIPM)

Slurry of purified terephthalic acid (6 kg) in ethylene glycol (4.5 kg) was esterified at 2 bar nitrogen pressure by gradual heating. When the temperature reached 260° C. in about 3.5 hr, the 2352 g of Co-SIPM$_2$ solution of Example 6(II)-A (containing 13.88 g Co) was added to the molten esterification product under stirring, when quick devolatilization of the added EG was reflected in rise of the reflux column temperature to about 180° C. An inert gas was passed through the vessel in order to remove the excess ethylene glycol. After an interval of 20 minutes, antimony trioxide catalyst (300 ppm Sb in PET) dissolved in ethylene glycol 250 ml was added. The mixture temperature was increased to ~285° C., while gradually reducing the pressure over 45 minutes to 1 mm of Hg to obtain the polymeric product. The copolymer product was extruded out of the reactor in the form of a strand, quenched in a water bath and sliced into chips containing 2000 ppm of cobalt. The I.V. and DEG of the copolymer were 0.41 and 5.7%.

C: SSP of Copolymer

The copolymer chips of example 6B were crystallized at 140° C. in air oven, and then subjected to SSP at 200° C. for 32 hrs to raise the intrinsic viscosity to 0.70.

D: Manufacture of Barrier Polyester Bottles with 200 ppm Co 0.8 kg of the copolymer chips of example 6C (containing 2000 ppm Co from Co-SIPM$_2$), and 0.4 kg of MXD6 chips and 6.8 kg of base polyester (poly(ethylene terephthalate-co-ethylene isophthalate), IV=0.80 dig) were tumble mixed, dried at 150° C. for 6 hr, and injection molded using 2 cavity Arburg injection molding machine (Model Allrounder 420C) operated at cylinder temperature of 275-280° C. and runner temperature of 290-287° C., into 48 g perform. These performs were blown into bottles of 1.5 L volume using SIDEL SB0I single cavity blow molding machine. The OTR value was found to be 0.03 cm$^3$·m$^{-2}$ day$^{-1}$ measured for film thickness of 0.28 mm.

Example 7

Manufacture of Barrier Polyester Bottles with 50 ppm Co 0.2 kg of the sulfonated copolymer chips of example 6C (containing 2000 ppm Co from Co-SIPM$_2$), and 0.4 kg of MXD6 chips and 7.4 kg of base polyester (poly(ethylene terephthalate-co-ethylene isophthalate), IV=0.80 dL/g) were tumble mixed, dried at 150° C. for 6 hr, and injection molded using 2 cavity Arburg injection molding machine (Model Allrounder 420C) operated at cylinder temperature of 275-280° C. and runner temperature of 290-287° C., into 48 g perform. These performs were blown into bottles of 1.5 L volume using SIDEL SB0I single cavity blow molding machine. The OTR value was found to be 0.015 cm$^3$·m$^{-2}$ day$^{-1}$ measured for film thickness of 0.28 mm.

Example 8

Use of Co-SIPM Obtained by Process Devoid of Venting Technique

A: Preparation of Copolymer (Co-SIPM)

Slurry of purified terephthalic acid (6 kg) in ethylene glycol (4.5 kg) was esterified at 2 bar nitrogen pressure by gradual heating in a 10 L electrically heated stainless steel autoclave equipped with a reflux column and condenser to remove the condensate, primarily water and excess EG. When the temperature reached 260° C. in about 3.5 hr, 2352 g of Co-SIPM$_2$ solution of Example 6A (containing 13.88 g Co) was added to the molten esterification product under stirring under the existing pressure by employing an intermediate pressurized vessel. After an interval of 20 minutes, antimony trioxide catalyst (300 ppm Sb in PET) dissolved in ethylene glycol 250 ml was added. The mixture temperature was increased to ~285° C., while gradually reducing the pressure over 45 minutes to 1 mm of Hg to obtain the polymeric product. The copolymer product was extruded out of the reactor in the form of a strand, quenched in a water bath and sliced into chips containing 2000 ppm of cobalt. The IV and DEG of the copolymer were 0.437 and 10.2% respectively.

B: Crystallization of Copolymer

The copolymer chips of example 8A were crystallized in air oven and directly used for injection molding for making preforms.

C: Manufacture of Barrier Polyester Bottles with 200 ppm Co 0.8 kg of the copolymer chips of example 8B (containing 2000 ppm Co from Co-SIPM$_2$), and 0.4 kg of MXD6 chips and 6.8 kg of base polyester (poly(ethylene terephthalate-co-ethylene isophthalate), IV=0.80 dig) were tumble mixed, dried at 150° C. for 6 hr, and injection molded using 2 cavity Arburg injection molding machine (Model Allrounder 420C) operated at cylinder temperature of 275-280° C. and runner temperature of 290-287° C., into 48 g perform. These performs were blown into bottles of 1.5 L volume using SIDEL SB0I single cavity blow molding machine. The OTR value was found to be 0.05 cm$^3$·m$^{-2}$ day$^{-1}$ measured for film thickness of 0.28 mm.

Example 9

Manufacture of 'Control' Polyester Bottles without MXD6

8 kg of base polyester (poly(ethylene terephthalate-co-ethylene isophthalate), IV=0.80 dL/g) were dried at 150° C. for 6 hr, and injection molded using 2 cavity Arburg injection molding machine (Model Allrounder 420C) operated at cylinder temperature of 275-280° C. and runner temperature of 290-287° C., into 48 g perform. These performs were blown into bottles of 1.5 L volume using SIDEL SB0I single cavity blow molding machine. The OTR value was found to be 6.9 cm$^3$·m$^{-2}$ day$^{-1}$ measured for film thickness of 0.28 mm.

Example 10

Manufacture of Polyester Bottles with MXD6

0.4 kg of MXD6 chips and 7.6 kg of base polyester (poly(ethylene terephthalate-co-ethylene isophthalate), IV=0.80 dL/g) were tumble mixed, dried at 150° C. for 6 hr, and injection molded using 2 cavity Arburg injection molding machine (Model All rounder 420C) operated at cylinder temperature of 275-280° C. and runner temperature of 290-287° C., into 48 g perform. These performs were blown into bottles of 1.5 L volume using SIDEL SB0I single cavity blow molding machine. The OTR value was found to be 2.08 cm$^3$·m$^{-2}$ day$^{-1}$ measured for film thickness of 0.28 mm. This corresponds to only a ~3x decrease in oxygen permeability.

Example 11

Preparation of Copolymer Containing Alkali Metal Sulfonate

Slurry of purified terephthalic acid (6 kg) in ethylene glycol (4.5 kg) was esterified at 2 bar nitrogen pressure by gradual heating in a 10 L electrically heated stainless steel autoclave equipped with a reflux column and condenser to remove the condensate, primarily water and excess EG. When the temperature reached 260° C. in about 3.5 hr, 0.56 kg of glycol ester of Na-SIPM (containing 0.140 kg Na-SIPM) dissolved in ethylene glycol to obtain pH neutral solution that was added to the molten esterification product under stirring under the existing pressure by employing an intermediate pressurized vessel. After an interval of 20 minutes, antimony trioxide catalyst (300 ppm Sb in PET) dissolved in ethylene glycol 250 ml was added. The mixture temperature was increased to ~285° C., while gradually reducing the pressure over 45 minutes to 1 mm of Hg to obtain the polymeric product. The copolymer product was extruded out of the reactor (in the form of a strand, quenched in a water bath and sliced into chips containing 1500 ppm of sodium. The IV and diethylene glycol (DEG) of the copolymer were 0.50 and 4.5% respectively. The somewhat high level of DEG (as compared to standard <2%) is related to employing batch process without heel.

Example 12

A) Synthesis of Co-pTSA 80.9 g of p-toluenesulfonic acid was dissolved in 1654 g water. To this, 59.1 g of Cobalt acetate (CoAc$_2$.4H$_2$O) was added and heated for 1 hr from 20 to 90° C. while employing a condenser to collect the by product, leaving cobalt sulphonate salt solution in water. The completion of the reaction was indicated from an increase in pH. Further, water in the product was removed using vacuum in a vacuum oven.

B) Preparation of a Polyester Component

Slurry of purified terephthalic acid (6 kg) in ethylene glycol (4.5 kg) was esterified for 3.5 hrs up to 260° C. at 2 bar nitrogen pressure. The vessel was vented to depressurize to atmospheric pressure. 120.8 g of Co-pTSA prepared in Example 12A was added to the molten esterification product. After an interval of 20 minutes, antimony trioxide catalyst (300 ppm Sb in PET) dissolved in ethylene glycol 250 ml was added. The mixture temperature was increased to ~285° C., while gradually reducing the pressure over 45 minutes to 1 mm of Hg to obtain polymeric product. The product was extruded out of the reactor in the form of a strand, quenched in a water bath and sliced into chips containing 2000 ppm of cobalt. The intrinsic viscosity of the polymer was determined as 0.30 (ASTM D4603). The copolymer chips were crystallized at 140° C. in air oven.

C) Manufacture of Barrier Polyester Bottles with 5% MXD6+50 Ppm Co 0.2 kg of the copolymer chips of example 12B (containing 2000 ppm Co from Co-pTSA), 0.4 kg of MXD6 chips and 7.4 kg of base polyester (poly (ethylene terephthalate-co-ethylene isophthalate), IV=0.84 dL/g) were tumble mixed, dried at 160° C. for 5 hr, and injection molded using 2 cavity Arburg injection molding machine (Model Allrounder 420C) operated at cylinder temperature of 275-280° C. and runner temperature of 290-287° C., into 48 g perform. These performs were blown into bottles of 1.5 L volume using SIDEL SB01 single cavity blow molding machine. The OTR value was found to be 0.025 cm$^3$·m$^{-2}$·day$^{-1}$ measured for film thickness of 0.30 mm.

The comparative results of oxygen transmission rate are provided herein below:
Results:

| Film Make(Standard Film Thickness of 0.28 mm) | OTR(cm$^3$· m$^{-2}$ · day$^{-1}$) | OTR Reduction with respect to PET Control |
|---|---|---|
| Example 1 (cobalt acetate addition before the melt polymerization) | 2.15 | ~3X |
| Example 2 (cobalt acetate addition during the melt polymerization) | 2.27 | ~3X |
| Example 4 (Cobalt acetate copolymer & venting) | 2.23 | ~3X |
| Example 5 (Cobalt acetate copolymer without venting) | 2.43 | ~3X |
| Example 6 (I) (Present Disclosure: Co-SIPM & venting [Co 200 ppm]) | 0.03 | >100X |
| Example 7 (Present Disclosure: Co-SIPM & venting [Co 50 ppm]) | 0.015 | >100X |
| Example 8 (Present Disclosure: Co-SIPM without venting [Co 200 ppm]) | 0.05 | >100X |
| Example 9: control (without MXD6) | 6.9 | — |
| Example 10 (MXD6 + cobalt acetate) | 2.08 | ~3.3X |
| Example 12 (Present Disclosure: Co-pTSA & venting [Co 50 ppm]) | 0.025 | >100X |

From the above results, it can be clearly observed that the OTR of the films made in accordance with the present disclosure ranges between 0.015 and 0.03 cc·m$^{-2}$ day$^{-1}$ at 0.28 mm thickness.

There is more than 100 fold reduction in OTR compared to the OTR of the films made as per the comparative examples (1, 2, 9 and 10). This indicates that the packaging articles made in accordance with the present disclosure exhibit enhanced barrier properties.

Thus, the use of Co-SIPM instead of cobalt acetate provides improved barrier properties. Further, the use of venting technique (depressurizing) provides the polyester product containing less amount of ether such as DEG. It is known that the high level of DEG formation, promoted by acidity of reaction mixture containing high EG, adversely affects the thermo-mechanical properties of the containers made therefrom.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "a", "at least" or "at least one" suggests the use of one or more elements or ingredients or quantities, as the use may be in the embodiment of the disclosure to achieve one or more of the desired objects or results.

The numerical values given for various physical parameters, dimensions and quantities are only approximate values and it is envisaged that the values higher or lower than the numerical value assigned to the physical parameters, dimensions and quantities fall within the scope of the disclosure and the claims unless there is a statement in the specification to the contrary.

While certain embodiments of the disclosure have been described, these embodiments have been presented by way of examples only, and are not intended to limit the scope of the disclosure. Variations or modifications in the composition of this disclosure, within the scope of the disclosure, may occur to those skilled in the art upon reviewing the disclosure herein. Such variations or modifications are well within the spirit of this disclosure.

What is claimed is:

1. A process for preparing a polyester polymer product comprising an at least partially cobalt-neutralized organic sulphonic acid component and having an ether content of less than 8 mole %, said process comprising the following steps:
   a. subjecting at least one dicarboxylic acid or mono-esters, di-esters or anhydrides thereof and at least one diol to esterification in a vessel by heating under pressure to obtain an esterified product;
   b. adding at least one at least partially cobalt-neutralized organic sulphonic acid to the esterified product to obtain a mixture;
   c. removing at least partially the diol from the esterified product or said mixture; and
   d. heating the mixture under reduced pressure to obtain the polyester polymer product comprising the at least one at least partially cobalt-neutralized organic sulphonic acid uniformly dispersed therein.

2. The process as claimed in claim 1, wherein the step of removing the diol is carried out by at least one technique selected from the group consisting of depressurizing the vessel under heat and an inert gas sweep under heat.

3. The process as claimed in claim 1, wherein the dicarboxylic acid is selected from the group consisting of terephthalic acid, isophthalic acid, succinic acid, glutaric acid, adipic acid, sebacic acid, naphthalene dicarboxylic acid, cyclohexane dicarboxylic acid and combinations thereof; the diol is selected from the group consisting of ethylene glycol, propylene glycol, 1,3-propanediol, 1,4-butanediol, 1,6-hexanediol, 8-octanediol, 1,10 decanediol, 2,2-dimethyl-1,3-propanediol, 1,4-cyclohexane dimethanol, 1,4-cyclohexanediol, cyclobutanediol, cyclobutane dimethanol, tetramethane cyclobutanediol, and combinations thereof; and the ether is selected from the group consisting of diethylene glycol, polyethylene glycol, polypropylene glycol, dipropylene glycol, polytetramethylene glycol and combinations thereof.

4. The process as claimed in claim 1, wherein the organic sulphonic acid is selected from the group consisting of sulfophthalic acid, dialkyl sulphopthalate, sulfoterephthalic acid, dialkyl sulfoterephthalate, sulfoisophthalic acid, dialkyl sulfoisophthalate, 4-sulfonaphthalene-2,7-dicarboxylic acid, dialkyl 4-sulfonaphthalene-2,7-dicarboxylate and organic sulfonic acids represented by the formula $R-SO_3H$, wherein R is an alkyl, substituted alkyl, aryl or substituted aryl moiety.

5. The process as claimed in claim 1, wherein the at least partially cobalt-neutralized organic sulphonic acid is cobalt sulphonate of dimethylisophthalate ($CoSIPM_2$).

6. The process as claimed in claim 1, wherein the at least partially cobalt-neutralized organic sulphonic acid is Co-pTSA.

7. The process as claimed in claim 1, further comprising a step of incorporating at least one polymerization catalyst, said polymerization catalyst being selected from the group consisting of salts and oxides of antimony, tin and titanium.

8. The process as claimed in claim 1, further comprising steps of extruding the polymer product, converting the extruded polymer product into chips, crystallizing the chips, and solid state polymerizing the crystallized chips.

9. A process for preparing an intermediate product made from the polymer product as claimed in claim 1; said process comprising formulating a moldable oxygen scavenging composition by mixing said polyester polymer product of claim 1, an organic oxidizable polymer and optionally a second polyester component to obtain a mass followed by drying and molding said mass to obtain an intermediate product,
   wherein the organic oxidizable polymer is at least one selected from the group consisting of:
      (i) a copolymer of m-xylenediamine and adipic acid (MXD6);
      (ii) an aliphatic poly-amide comprising repeating units of the general formula $-CO(CH_2)nCONH(CH_2)mNH-$ or $(CH_2)pCONH-$, wherein any of n, m or p is an integer between 3 and 7; and
      (iii) a co-polyester, derived from hydroxyl- or carboxyl-terminated monomeric, oligomeric or polymeric olefin or olefin oxide segments capable of oxygen scavenging, constituted by at least one member selected from the group consisting of a dicarboxylic, hydroxycarboxylic or dihydroxy compound comprising at least one olefinic unsaturation,
   wherein and the second polyester component comprises:
      (i) at least one member selected from the group of dicarboxylic acids consisting of terephthalic acid, isophthalic acid, succinic acid, glutaric acid, adipic acid, sebacic acid, naphthalene dicarboxylic acid, cyclohexane dicarboxylic acid and anhydrides or diesters or monoesters thereof with a lower alcohol; and
      (ii) at least one member selected from the group of diols consisting of ethylene glycol, propylene glycol, 1,3-propanediol, 1,4-butanediol, 1,6-hexane diol, 8-octanediol, 1,10 decanediol, 2,2-dimethyl-1,3-propanediol, 1,4-cyclohexane dimethanol, 1,4-cyclohexanediol, cyclobutanediol, cyclobutane dimethanol, tetramethane cyclobutanediol and their ester forming derivatives.

10. The process as claimed in claim 9, further comprising a step of adding at least one at least partially cobalt-neutralized organic sulphonic acid during the mixing the polyester polymer product of claim 1, the at least one organic oxidizable polymer and optionally the second polyester component.

11. The process as claimed in claim 9, wherein the organic oxidizable polymer is poly (m-xylene adipamide).

12. The process as claimed in claim 9, wherein the second polyester component comprises a copolymeric condensate of ethylene terephthalate and ethylene isophthalate, the amount of ethylene isophthalate being <2.5 mole %.

13. A process for preparing a packaging article defined by walls having an oxygen transmission rate (OTR) less than 0.2 $cc \cdot m^{-2} \, day^{-1}$ at 0.28 mm thickness, said process comprising:

i) formulating a moldable oxygen scavenging composition by mixing said polyester polymer product of claim 1, an organic oxidizable polymer and optionally a second polyester component to obtain a mass; and ii) drying and molding said mass to obtain an intermediate product followed by converting said intermediate product into the packaging article, wherein the organic oxidizable polymer is at least one selected from the group consisting of:

(i) a copolymer of m-xylenediamine and adipic acid (MXD6);

(ii) an aliphatic poly-amide comprising repeating units of the general formula —$CO(CH_2)nCONH(CH_2)mNH$— or $(CH_2)pCONH$—, wherein any of n, m or p is an integer between 3 and 7; and (iii) a co-polyester, derived from hydroxyl- or carboxyl-terminated monomeric, oligomeric or polymeric olefin or olefin oxide segments capable of oxygen scavenging, constituted by at least one member selected from the group consisting of a dicarboxylic, hydroxy-carboxylic or dihydroxy compound comprising at least one olefinic unsaturation, and the second polyester component comprises:

(i) at least one member selected from the group of dicarboxylic acids consisting of terephthalic acid, isophthalic acid, succinic acid, glutaric acid, adipic acid, sebacic acid, naphthalene dicarboxylic acid, cyclohexane dicarboxylic acid and anhydrides or diesters or monoesters thereof with a lower alcohol; and (ii) at least one member selected from the group of diols consisting of ethylene glycol, propylene glycol, 1,3-propanediol, 1,4-butanediol, 1,6-hexane diol, 8-octanediol, 1,10 decanediol, 2,2-dimethyl-1,3-propanediol, 1,4-cyclohexane dimethanol, 1,4-cyclohexanediol, cyclobutanediol, cyclobutane dimethanol, tetramethane cyclobutanediol and their ester forming derivatives.

14. The process as claimed in claim 13, further comprising a step of adding at least one at least partially cobalt-neutralized organic sulphonic acid during the mixing the polyester polymer product of claim 1, the organic oxidizable polymer and optionally the second polyester component.

15. The process as claimed in claim 13, wherein the molding is carried out by using an injection molding technique in a molding machine operated at 270 to 310° C.

16. The process as claimed in claim 13, wherein the step of converting said intermediate product into the oxygen barrier packaging article includes blowing of said intermediate product, wherein said oxygen barrier packaging article is a bottle.

17. A polyester polymer product prepared by the process of claim 1, comprising at least partially cobalt-neutralized organic sulphonic acid component and having ether content less than 8 mole %, wherein the organic sulphonic acid is selected from the group consisting of sulfophthalic acid, dialkyl sulphopthalate, sulfoterephthalic acid, dialkyl sulfoterephthalate, sulfoisophthalic acid, dialkyl sulfoisophthalate, 4-sulfonaphthalene-2,7-dicarboxylic acid, dialkyl 4-sulfonaphthalene-2,7-dicarboxylate and organic sulfonic acids represented by the formula R—$SO_3H$, wherein R is an alkyl, substituted alkyl, aryl or substituted aryl moiety.

18. The product as claimed in claim 17, wherein the at least partially cobalt-neutralized organic sulphonic acid is selected from the group consisting of cobalt sulphonate of dimethylisophthalate ($CoSIPM_2$) and Co-pTSA.

19. A moldable scavenging composition comprising:

A) the polyester polymer product of claim 17;

B) optionally a polyester component comprising (i) at least one member selected from the group of dicarboxylic acids comprising terephthalic acid, isophthalic acid, succinic acid, glutaric acid, adipic acid, sebacic acid, naphthalene dicarboxylic acid and cyclohexane dicarboxylic acid or anhydrides or diesters or monoesters thereof with a lower alcohol; and (ii) at least one member selected from the group of diols comprising ethylene glycol, propylene glycol, 1,3-propanediol, 1,4-butanediol, 1,6-hexane diol, 8-octanediol, 1,10 decanediol, 2,2-dimethyl-1,3-propanediol, 1,4-cyclohexane dimethanol, 1,4-cyclohexanediol, cyclobutanediol, cyclobutane dimethanol, tetramethane cyclobutanediol and their ester forming derivatives; and C) an organic oxidizable polymeric component selected from the group consisting of:

(i) a copolymer of m-xylenediamine and adipic acid (MXD6);

(ii) an aliphatic poly-amide comprising repeating units of the general formula —$CO(CH_2)nCONH(CH_2)mNH$— or $(CH_2)pCONH$—, wherein any of n, m or p is an integer between 3 and 7; and (iii) a co-polyester, derived from hydroxyl- or carboxyl-terminated monomeric, oligomeric or polymeric olefin or olefin oxide segments capable of oxygen scavenging, constituted by at least one member selected from the group consisting of a dicarboxylic, hydroxy-carboxylic or dihydroxy compound comprising at least one olefinic unsaturation.

20. The composition as claimed in claim 19, wherein the at least partially cobalt-neutralized organic sulphonic acid is selected from the group consisting of cobalt sulphonate of dimethylisophthalate ($CoSIPM_2$) and Co-pTSA.

21. The composition as claimed in claim 19, wherein the organic oxidizable polymer is poly(m-xylene adipamide) and the polyester component comprises a copolymeric condensate of ethylene terephthalate and ethylene isophthalate, the amount of ethylene isophthalate being <2.5 mole %.

22. A packaging article defined by walls having an oxygen transmission rate (OTR) less than 0.2 $cc \cdot m^{-2} \ day^{-1}$ at 0.28 mm thickness made from the composition as claimed in claim 19.

* * * * *